United States Patent Office 3,685,952
Patented Aug. 22, 1972

3,685,952
COLORATION OF POLYESTER TEXTILE FIBERS WITH AZO DYES
Edgar Earl Renfrew, Lock Haven, Pa., assignor to American Aniline Products, Inc., Paterson, N.J.
No Drawing. Filed Aug. 26, 1971, Ser. No. 175,397
Int. Cl. D06p 1/18
U.S. Cl. 8—41 C
6 Claims

ABSTRACT OF THE DISCLOSURE

Polyester fabric is dyed with azo dyes made by coupling an appropriate diazotized aminobenzene into an α-(N-alkylanilino)-m-toluene-sulfonamide, typified by α-(N-ethylanilino)-m-toluene-sulfonamide. This class of azo dyes, when appropriately dispersed, produces dyeings on aromatic polyester fabrics with excellent substantivity, outstanding sublimation fastness, and good fastness to light. The dyes are applied to polyesters, such as polyethylene terepthalate, by carrier dyeing, pressure dyeing and thermofixation methods.

BACKGROUND OF THE INVENTION

Among the polyester fibers, those based on polyethylene terephthalate continue to be the most important, although fibers based on 1,4-dimethylcyclohexane terephthalate have become commercially available. Developments in both homo- and copolyesters have continued and many modified versions of polyethylene terephthalate have recently appeared on the market. With the advent of new fibers, the search has continued for dyes which build up on the various types of polyester fabric proportionate to the amount of the dye applied, and which are characterized by good light and excellent sublimation properties.

In polyethylene terephthalate fibers, the diffusion of the dye into the fiber is effectively controlled by the mobility of the chain molecules in the disordered regions. However, the molecular shape and the size of the dye, the presence of polar groups and general steric considerations are also important in relation to the rate of diffusion.

We have discovered that certain water insoluble azo dyes diffuse well into the now available polyester fibers. These dyes can be applied by any of the standard methods and the resulting dyeings are characterized by good light fastness and outstanding sublimation properties.

SUMMARY OF THE INVENTION

In accordance with the invention, there is provided polyester textile material dyed with a dye of the formula:

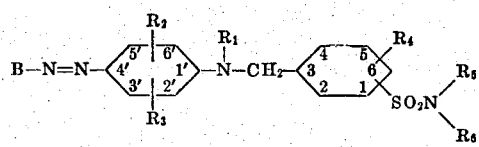

In the above formula, B is a benzene nucleus, either unsubstituted or substituted with nitro, chloro, bromo, lower alkyl, lower alkoxy, cyano, lower acylamido, sulfamyl, N-(lower alkyl)sulfamyl, N,N-di(lower alkyl)sulfamyl, trifluoromethyl, and lower alkylsulfonyl. B can be substituted with one to three of the same or different groups. $R_1$ is lower, alkyl, cyano lower alky or hydroxy lower alkyl and $R_2$, $R_3$, and $R_4$ are hydrogen, lower alkyl, lower alkoxy, chlorine or bromine. $R_5$ and $R_6$ are hydrogen, lower alkyl, cyano lower alkyl or hydroxy lower alkyl.

The dyes are applied by carrier dyeing, pressure dyeing and thermofixation, using standard methods.

DETAILED DESCRIPTION

The preferred dyes used in making the dyed polyester fibers of the invention are those of the formula:

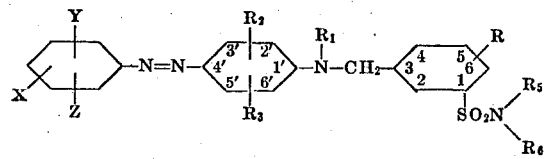

in which X, Y and Z are hydrogen, nitro, chloro, bromo, lower alkoxy, lower alkyl, cyano, sulfamyl, N-(lower alkyl)sulfamyl, N,N-(di lower alkyl)sulfamyl, lower acylamido, trifluoromethyl and lower alkyl sulfonyl. $R_1$, $R_2$, $R_3$, $R_4$, $R_5$ and $R_6$ have the meanings given aforesaid.

The dyes are made in the conventional manner by adding a diazotized aminobenzene to a solution of an appropriate coupling component.

Typical aminobenzenes useful as the diazotizable base in the coupling reaction are aniline, o-, m-, or p-phenetidine, o-, m-, or p-aminobenzonitrile, sulfanilamide, metanilamide, $N^1$-methylsulfanilamide, $N^1,N^1$-dimethylsulfanilamide, $N^1,N^1$-dicyanoethylsulfanilamide, $N^1,N^1$-dimethylmetanilamide, p-aminoacetanilide, 2,4-dichloroaniline, 2,5-dichloroaniline, p-bromoaniline, 2,4-dimethoxyaniline, 3,5-dimethoxyaniline, p-aminomethanesulfonanilide, m- or p-nitroaniline, 4-nitro-o-toluidine, 2-chloro-4-nitroaniline, 3-chloro-4-nitroaniline, 2,6-dichloro-4-nitroaniline, 2-amino-5-nitrobenzonitrile, 2-methylsulfonyl-4-nitroaniline, 4-nitro-o-anisidine, 4-nitro-o-phenetidine, 2,4-dinitroaniline, 6-chloro-2,4-dinitroaniline, 6-bromo-2,4-dinitroaniline, and 2-amino-3,5-dinitrobenzonitrile. Among the foregoing substituted anilines, those bearing, in addition to other substituents, a single nitro group, para or meta to the amine function, are preferred because they provide enhanced light fastness in the final product.

The aminobenzene intermediate is diazotized in the usual way by heating it in an aqueous solution of strong mineral acid such as hydrochloric acid, cooling the resulting solution to a temperature of 0–10° C. and adding thereto a quantity of sodium nitrite slightly in excess of the stoichiometric requirement. An alternate method of diazotization involves dissolving sodium nitrite in concentrated sulfuric acid, heating to a temperature of about 60–70° C., cooling the resulting solution to 0–10° C. and adding thereto the aminobenzene.

Couplers useful in preparing the dyes are made by chlorosulfonation of a suitable tertiary amine, followed by reaction with ammonia, a primary aliphatic amine or a secondary aliphatic amine. Tertiary amine bases which are suitable for the chlorosulfonation reaction are made by the reaction between an N-alkylaniline and a benzyl halide. Particularly useful couplers include α-(N-methylanilino)-m-toluenesulfonamide,
α-(N-ethylanilino)-m-toluenesulfonamide,
α-(N-cyanoethylanilino)-m-toluenesulfonamide,
α-(N-methyl-m-toluino)-m-toluenesulfonamide,
α-(N-ethyl-o-chloroanilino)-m-toluenesulfonamide,
α-(N-ethylanilino)-m-(6-chlorotoluenesulfonamide),
α-N-methylaniline)-m-(4-methoxytoluenesulfonamide),
α-(N-ethylanilino)-m-(N,N-dimethyltoluenesulfonamide),
α-(N-cyanoethylanilino)-m-(N-ethyltoluenesulfonamide),
α-(N-methylanilino)-m-(N-cyanoethyltoluensulfonamide), and
α-(N-ethylanilino)-m-(N,N-dihydroxyethyltoluenesulfonamide).

The structure of these and other useful couplers are thus:

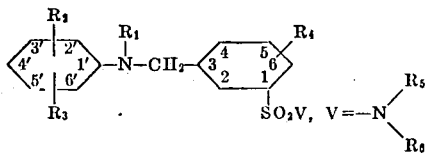

The 4'-position is unsubstituted since it must be available as a coupling site to be useful. The position of the sulfonamido group has been assigned by analogy with the sulfonic acid studies of Blanguy, L., H. E. Fierz-David, G. Stamm, Helv. Chim. Acta., 25 1162 (1942) in which similar N-alkyl-N-arylbenzyl amines were sulfonated, yielding mainly the substituted m-toluenesulfonic acid, V=OH. However, other products were isolated and must represent other positions of the entering sulfo group. Thus, it is highly presumptive that chlorosulfonation behaves similarly, and certain amounts of sulfonamides of the structure are formed. They are useful couplers if the sulfonamide group is in the benzyl moiety.

It is possible to synthesize suitable N-alkylanilino-α-p-toluenesulfonamide by treating N-alkylanilines unsubstituted in the para position with α-chloro (or bromo) -p-toluenesulfonamide and their N-substituted and N,N-di substituted derivatives. The method is not as attractive economically or procedurally as in the chlorosulfonation method. Both series of couplers give dyes of the same excellent fastness ratings.

The azo dyestuffs used in the invention are made by the reaction of the diazotized aminobenzene with the coupler by adding the diazonium salt to a cold aqueous solution of the coupler. A buffering agent, such as sodium acetate is added to reduce the acidity to a pH of 5 to 7. The mixture is allowed to react for 8-24 hours at room temperature and is thereafter filtered and washed acid free. The desired azo product is thus obtained in the form of a wet cake.

To prepare the product for application to the polyester substrates noted hereabove, it must be suitably dispersed. This may be done by any of the several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and wetting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10-40 percent by weight (pure color) active dye base.

Disperse powders are prepared by wet milling color in the presence of a dispersant, such as those mentioned hereabove, in equipment such as a ball mill. Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25-60 percent by weight color content (pure color).

The dye, when added to water with or without auxiliary agents, forms a near colloidal aqueous dispersion from which the aromatic polyester fiber or textile material is dyed in the conventional manner at 40–100° C. (104–212° F.) to give a colored fiber containing about 0.01–2 percent by weight dye (100% color basis).

Alternatively, dyeing may be accomplished without a carrier at temperatures of 100–150° C. under pressure. Also, the dye may be applied in patterns by conventional printing methods, if desired.

The dye can be also applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180–220° C. (356–428° F.) are used for 30 to 90 seconds. If the fabric contains cotton or viscose rayon, apart from synthetic fibers, there is little danger of damaging cellulosic portions, but if wool is present, the temperature must be kept within 180–200° C. and the time must be reduced to 30 seconds.

In order to evaluate the effectiveness of a particular dye for a given type of fiber, the dyed fiber is examined for stantivity of the color, light fastness of the color, and resistance of the color to sublimation. Specific tests for the evaluation of the color to sublimation. Specific tests for the evaluation of these important properties are described in the examples that follow.

Our invention is further illustrated by the following examples:

EXAMPLE 1

A dye of the formula:

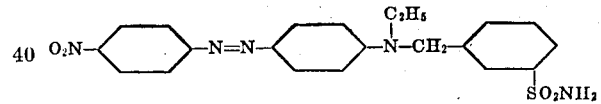

was prepared as follows:

(A) Diazonium solution

In a suitable flask equipped with a stirrer, a heater and thermometer were charged: 27.6 parts p-nitroaniline, 60 parts hydrochloric acid (32%) and 60 parts water. The mixture was stirred at 80° C. until solution resulted. The solution was poured into a mixture of 160 parts water and 160 parts ice.

While maintaining the temperature at 0° C. by the addition of ice as needed, there was added 14.0 parts sodium nitrite in 40 parts water.

The diazotization mixture was stirred for one hour at 0–5° C. Excess nitrous acid was then destroyed by the addition of small portions of sulfamic acid. The diazotization solution was clarified by passing it through a bed of diatomaceous earth on a filter. The filter was washed with a small portion of ice water, the washings being collected with the filtrate.

(B) Coupler solution

A mixture of 58.0 parts α-[N-ethylanilino]-m-toluenesulfonamide in 2000 parts water containing 46 parts hydrochloric acid (32%) was stirred to solution at 65° C. It was allowed to cool to 25–30°, at which temperature enough ice was added to lower the temperature to 0° C.

(C) Coupling

To the cold solution (B) was added the cold solution (A), followed by 370 parts sodium acetate solution (20% weight by volume as rapidly as the coupling progressed. Stirring was continued for two hours below 10° C., and for twelve hours more during which time the temperature was allowed to rise to that of the surroundings. The azo product was isolated by filtration and washed with water on the filter until the washings were no longer acidic. The cake was dried at 80° C. It weighed 84.5 parts, representing a yield of over 96%. The product melted above 200° C.

(D) Dispersion

To a ball-mill were charged 60.0 parts azo product (C), 42.0 parts "Reax 85–A" (a commercially available sodium lignin sulfonate), 298.0 parts water, and a very small amount of "Surfynol 104" (a commercially available foam-control agent, said to be a ditertiary acetylenic glycol surfactant).

Milling was continued until a suitable dispersion had been achieved as shown by filtration tests. The resulting disperse paste contained 15% by weight of the azo product of Part C.

EXAMPLE 2

An aqueous dye bath containing 10% Marcron L (a commercially available phenolic dye carrier) and 1% monosodium phosphate as a buffering agent was prepared. Type 54 "Dacron" polyester fabric was treated in a bath at 120° C. for 10 minutes, the fabric-to-water dye bath ratio being 1:40. The disperse dye made as described in Example 1 was added in an amount sufficient to provide a bath containing 0.4% dye based on the weight of polyester fibers. Dyeing was continued for one hour at 205° F. and the fabric was removed from the bath, rinsed and dried. Sample dyeings were tested for sublimation according to standard AATCC Color Fastness to Dry Heat (sublimation) Test No. 117–1967T, p. 123 of the 1970 Technical Manual of the American Association of Textile Chemists and Colorists. Dyed fabric was placed between a sandwich of undyed "Dacron" polyester fabric and heat was applied for 30 seconds. Sublimation tests were made at 350° F. and 400° F. on goods as described above. The dyeing was characterized by bright reddish orange hue. Sublimation tests showed substantially no transfer of color, even at 400° F.

Similar excellent results were obtained when the dye was applied to the fabric by thermofixation methods and then tested for sublimation as described above.

The dyeings were also tested for light fastness by subjecting them to carbon arc fading in accordance with AATCC. Color Fastness to Light, Carbon Arc Lamp, Continuous Light Test No. 16A–1964, as detailed on p. 127, of the 1970 Technical Manual of the AATCC. The dyeings showed only a very slight break at 20 hours' exposure, indicating good fastness to light.

EXAMPLE 3

A dye of the formula:

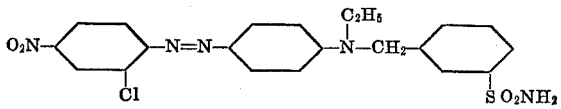

was prepared as follows:

(A) Diazonium solution

To a suitable vessel was charged 34.5 parts o-chloro-p-ntiroaniline, 126 parts hydrochloric acid (32%), 80 parts water, and 5 parts "Tween 20" (a commercially available surface active material said to be a polyoxyethylene sorbitan monolaurate). The mixture was stirred at 80° C. for ten minutes, or until solution or fine division occurred. The charge was then poured into a mixture of 200 parts ice and 100 parts water. More ice was added as needed to reach and maintain a temperature of 0° C.

To this mixture was added 14.0 parts sodium nitrite dissolved in 60 parts water. Stirring was continued for fifteen minutes, after which time the excess nitrous acid was destroyed with a sufficient small amount of sulfamic acid.

The solution was clarified through a filter coated with a diatomaceous earth filter aid, and maintained cold for immediate use in coupling. (Part C below.)

(B) Coupler

In a suitable vessel was dissolved by stirring at 60–80° C. 58.0 parts α-(N-ethylanilino-m-toluenesulfonamide in 1000 parts water containing 46 parts hydrochloric acid (32%). The solution was cooled externally to 30° C., and then to 0° C. by adding ice.

(C) Coupling

The solution from Part A was added to the solution of Part B, followed by 400 parts sodium acetate solution (20%, weight by volume). Both additions were made at 0–4° C. Stirring was continued for twelve hours, during which time the temperature was allowed to rise to that of the room.

The temperature was then raised to 60° C., and the azo product was collected on a filter and washed with water until the washings were no longer acidic. The azo product was dried. It weighed 89 parts, indicating a yield of 93% of the theoretical amount. The product melted at 139–142° C.

(D) Dispersion

In a suitable mill was charged 60.0 parts azo product from Part C, 58.0 parts "Lignosol FTA" (a lignin sulfonic acid material offered commercially as a dispersing material) and 282.0 parts water. Milling was carried on until the mixture passed filter tests indicating it was finely divided and dispersed suitably for use as a dye. The color content of the resultant disperse paste was 15%.

(E) Dyeing and properties

Polyester fabrics dyed with the disperse paste of Part D by the methods described in Example 2 were red in hue. The dyeings showed good lightfastness properties, and were outstanding in fastness to sublimation tests as decribed in Example 2.

EXAMPLE 4

A dye of the formula:

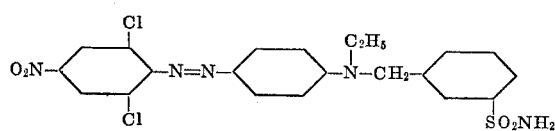

was prepared as follows:

(A) Diazonium solution

To a suitable vessel equipped with a stirrer, a heater and a thermometer was charged 200 parts sulfuric acid (66° Bé.; 96%). To this, maintained at 10–14° C. by external cooling, was added 14.2 parts sodium nitrite. The temperature was raised to 65° C. to bring about solution, then cooled externally to 8° C.

There was added in portions 41.8 parts 2,6-dichloro-4-nitroaniline at 8–14° C. After all had been added, stirring was continued for two hours, during which time the temperature was allowed to rise to 25° C.

Just before using (see Part C) the charge was drowned into a mixture made from 200 parts water and 300 parts ice. The drowning mass was filtered through a bed of diatomaceous earth filter aid, which was then washed with a minimal amount of ice water.

(B) Coupler solution

A quantity of 59.3 parts α-(N-ethylanilino)-m-toluenesulfonamide was dissolved at 60° C. in 1000 parts water containing 48 parts hydrochloric acid (32%). The solution was cooled to 30° C. externally, and then to 0° C. by adding sufficient ice.

(C) Coupling

To the solution from Part B was added the solution from Part A in portions while stirring. Coupling took place rapidly. After the addition, stirring was continued for twelve hours, during which time the temperature was allowed to rise to that of the surroundings. Heat was then applied to raise the temperature to 63° C., whereupon the azo product was collected on a suction filter and washed free of acid with warm water. The product was dried. It weighed 99.8 parts; this is a yield of 98% of the theoretical amount. The product melted at 129–135° C.

(D) Dispersion

In a suitable mill was charged 50.0 parts of the product from (C) above, 48.0 parts "Lignosol FTA" (a lignin sulfonic acid dispersing material available commercially) and 222.0 parts water. Milling was carried on until filter tests showed that particle size and dispersion stability were adequate for established dyeing methods for polyester fibers. The paste strength was 15% azo product (from Part C) by weight.

(E) Dyeing and properties

Polyester fabrics and fibers dyed with the disperse paste of Part D by the methods described in Example 2 were orange in hue. The fastness to light, staining behavior and other properties which must be met for acceptable performance by dyed polyester were good. Sublimation fastness was exceptionally good.

EXAMPLE 5

A dye of the formula

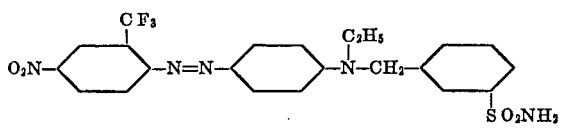

was prepared as follows:

(A) Diazonium solution

A diazonium solution was prepared essentially in the manner of Example 3, Part A, but using 41.2 parts of 2-amino-5-nitrobenzotrifluoride in place of the 34.5 parts of o-chloro-p-nitroaniline.

(B) Coupling solution

A coupler solution was made exactly in the manner described in Example 3, Part B.

(C) Coupling

The combination of the solutions from Part A and Part B were carried out exactly in the manner described in Example 3, Part C, as was the isolation and treatment of the product. It weighed 94 parts.

(D) Dispersion

The dispersing of the azo product of Part C was done as described in Part D, Example 3.

(E) Dyeing and properties

Dyeing was carried out as described in Example 3, Part E.

The hue of the dyed polyester was a bluish-red. Properties were very good, especially to light and sublimation tests.

EXAMPLE 6

A dye of the formula:

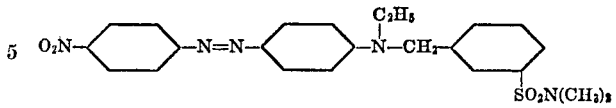

was prepared as follows:

(A) Diazonium solution

A solution was prepared exactly in the manner described in Example 1, Part A.

(B) Coupler solution

A solution was prepared in the way described in Example 1, Part B, except that 63.6 parts α-(N-ethylanilino)-m-(N,N-dimethyltoluenesulfonamide) was used instead of 58 parts α-N-ethylanilino-m-toluenesulfonamide.

(C) Coupling

Coupling was carried out as in Example 1, Part C.

(D) Dispersion

The product from (C) was dispersed as detailed in Example 1, Part D.

(E) Dyeing and properties

The disperse dye was applied to polyester fabrics as described in Example 2. Hue, brightness and properties were virtually the same as those described for the dyed goods of Example 2. Fastness to sublimation was equal, being outstandingly good.

EXAMPLE 7

A dye of the formula:

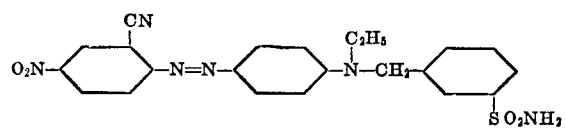

was prepared as follows:

(A) Diazotization solution

In a suitable vessel was charged 300 parts sulfuric acid (66° Bé). Below 15° C. was added in portions 14.2 parts sodium nitrite. The mixture was heated while stirring to 65°. It was then cooled externally to 5° C.

To the stirred mass at 5° C. was added slowly 33.6 parts 2-amino-5-nitrobenzonitrile. The mass was stirred at 5–7° C. for four hours.

Just prior to use in Part C (below) the mass was poured into a mixture made from 600 parts ice and 800 parts water containing 2 parts sulfamic acid. The solution was clarified through a bed of diatomaceous earth filter aid, and used immediately.

(B) Coupler solution

A solution was prepared exactly in the way described in Example 1, Part B.

(C) Coupling

Coupling was carried out in the manner described in Example 4, Part C. The dried product weighed 87.7 parts. The yield is 95% of the theoretical value.

(D) Dispersion

The azo product from (C) was dispersed exactly in the way described in Example 4, Part D.

(E) Dyeing and properties

The disperse dye of Part D was applied to polyester in the ways described in Example 2. The goods was colored an attractive rubine. The performance of the goods in fastness tests was very good. Sublimation fastness was especially outstanding.

EXAMPLE 8

A dye of the formula:

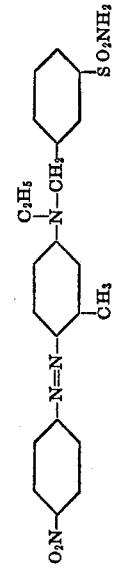

was prepared as follows.

Polyester dyed with the subject dye was prepared in the manner described in Examples 1 and 2, except that in Example 1, Part B, 60.8 parts of α-(N-ethyl-m-toluino)-m-toluenesulfonamide was used instead of the equivalent amount of α-(N-ethylanilino)-m-toluenesulfonamide.

The dyed fabric was markedly redder in hue than that prepared in Example 2, being a yellowish-scarlet.

The performance of the fabric to standard fastness tests as described elsewhere was excellent. Sublimation tests showed virtually no color transfer even at 400° F.

EXAMPLES 9-49

Polyester fibers and fabrics dyed with dyes of indicated structures show hues ranging from orange to violet. Light fastness in general is good; in all cases sublimation is outstandingly good. The columns designated as B, $R_1$, $R_2$, etc. refer to the general formula in col. 1.

EXAMPLES 9 TO 49

| Example | B | $R_1$ | $R_2$ | $R_3$ | $R_4$ | $R_5$ | $R_6$ | Hue | Properties of dyeing |
|---|---|---|---|---|---|---|---|---|---|
| 9 | $O_2N$-phenyl | $C_2H_5$ | H | H | H | H | H | Bright orange | Excellent sublimation good light. |
| 10 | $H_3CO_2S$-phenyl-$CH_3$ | $C_2H_5$ | H | H | H | H | H | ...do... | Do. |
| 11 | $O_2N$-phenyl-$CH_3$ | $C_2H_5$ | H | H | H | H | H | Yellowish scarlet | Do. |
| 12 | $O_2N$-phenyl-Br | $C_2H_5$ | H | (3'—)$CH_3$ | H | $CH_3$ | $CH_3$ | Bluish red | Do. |
| 13 | CN-phenyl-CN | $C_2H_5$ | H | (3'—)$CH_3$ | H | $CH_3$ | $CH_3$ | Scarlet | Do. |
| 14 | $H_2NO_2S$-phenyl | $CH_3$ | H | H | H | H | H | Yellow-orange | Do. |
| 15 | $H_3CSO_2NH$-phenyl-$OCH_3$ | $CH_3$ | H | H | H | H | H | ...do... | Do. |
| 16 | $O_2N$-phenyl-$OCH_3$ | $C_2H_5$ | H | H | H | $CH_3$ | $CH_3$ | Red | Do. |
| 17 | Cl-phenyl | $CH_2CH_2CN$ | H | H | H | $CH_3$ | $CH_3$ | Orange | Do. |

EXAMPLES 9 TO 49—Continued

| Example | B | $R_1$ | $R_2$ | $R_3$ | $R_4$ | $R_5$ | $R_6$ | Hue | Properties of dyeing |
|---|---|---|---|---|---|---|---|---|---|
| 18 | H₃CCNH—⟨ph⟩— (O=C) | C₂H₅ | (3')—CH₃ | H | H | H | H | Red | Excellent sublimation good light. |
| 19 | NC—⟨ph⟩— | C₂H₅ | (3')—CH₃ | H | H | H | H | Red | Do. |
| 20 | H₂NO₂S—⟨ph⟩— | CH₂CH₂CN | H | H | H | C₂H₅ | H | Orange | Do. |
| 21 | H₃CHNO₂S—⟨ph⟩— | CH₂CH₂CN | H | H | H | CH₃ | CH₃ | do | Do. |
| 22 | (CH₃)(CH₃)NO₂S—⟨ph⟩— | CH₃ | H | H | H | CH₃ | CH₃ | do | Do |
| 23 | NC—⟨ph⟩—Cl | C₂H₅ | (3')—OCH₃ | H | H | H | H | Red | Do. |
| 24 | O₂N—⟨ph⟩— | N—C₃H₇ | H | H | H | H | H | Red | Do. |
| 25 | O₂N—⟨ph⟩—Cl | C₂H₅ | H | (5')—Cl | H | H | C₂H₅ | Red | Do. |
| 26 | O₂N—⟨ph⟩—CH₃ | C₂H₅ | (2')—Cl | H | H | CH₂CH₂CN | CH₂CH₂CN | Red-orange | Do. |
| 27 | O₂N—⟨ph⟩— | C₂H₅ | H | H | H | CH₂CH₂CN | CH₂CH₂CN | Bluish red | Do. |
| 28 | O₂N—⟨ph⟩—Cl | CH₃ | (3')—CH₃ | H | H | CH₂CH₂OH | CH₂CH₂OH | Red-orange | Do. |
| 29 | O₂N—⟨ph⟩—Cl | C₂H₅ | H | H | H | CH₂CH₂OH | CH₂CH₂OH | Rubine | Do. |
| 30 | O₂N—⟨ph⟩— | CH₃ | (3')—CH₃ | H | H | H | H | Red | Excellent sublimation |
| 31 | O₂N—⟨ph⟩—Cl | CH₃ | (2')—CH₃ | H | H | H | H | Red | Do. |
| 32 | O₂N—⟨ph⟩— | C₂H₅ | (2')—CH₃ | H | H | H | H | Yellow red | Do. |
|  | O₂N—⟨ph⟩— | C₂H₅ | (3')—Cl | H | H | H | H |  |  |

EXAMPLES 9 TO 49—Continued

| Example | B | $R_1$ | $R_2$ | $R_3$ | $R_4$ | $R_5$ | $R_6$ | Hue | Properties of dyeing |
|---|---|---|---|---|---|---|---|---|---|
| 33 | 4-CH₃-2-O₂N-C₆H₃- | CH₃ | (2')—Br | H | H | CH₃ | CH₃ | Rubine | Excellent sublimation |
| 34 | 4-I-2-O₂N-C₆H₃- | C₂H₅ | (2')—CH₃ | (5')—CH₃ | H | CH₃ | CH₃ | Red | Do. |
| 35 | 3,4-Cl₂-2-O₂N-C₆H₃- (with CH₃) | n-C₄H₉ | H | H | H | CH₃ | H | Orange brown | Do. |
| 36 | 4-Cl-2-O₂N-C₆H₃- | —OCH(CH₃)(CH₃) | H | H | H | CH₃ | H | Red | Do. |
| 37 | 4-I-2-O₂N-C₆H₃- | —C₂H₅ | H | H | H | CH₂CH₂OH | H | Reddish orange | Do. |
| 38 | Same as above | C₂H₅ | H | H | (5)Cl | CH₃ | CH₃ | do | Do. |
| 39 | 4-Cl-2-O₂N-C₆H₃- | C₂H₅ | (3')CH₃ | H | (5)OCH₃ | H | H | Red | Do. |
| 40 | 4-Cl-2-O₂N-C₆H₃- | C₂H₅ | H | H | (5)CH₃ | CH₃ | CH₃ | Red | Do. |
| 41 | 4-CH₃-2-O₂N-C₆H₃- | C₂H₅ | (3')CH₃ | H | (4)Cl | CH₃ | H | Bulsh rubine | Do. |
| 42 | 4-CN-2-O₂N-C₆H₃- | C₂H₅ | H | H | (6)CH₃ | CH₂CH₂OH | H | Rubine | Do. |
| 43 | 4-Br-2-O₂N-C₆H₃- | C₂H₅ | H | H | H | CH₃ | CH₃ | Violet | Light fastness fair sublimation perfect. |
| 44 | 4-NO₂-2-(CH₃)₂NO₂S-C₆H₃- | C₂H₅ | (3')—OCH₃ | H | H | H | H | Reddish orange | Sublimation excellent. |
| 45 | 2-O₂N-C₆H₄- | —CH₂CH₂OH | H | H | H | H | H | do | Do. |

EXAMPLES 9 TO 49—Continued

| Example | B | $R_1$ | $R_2$ | $R_3$ | $R_4$ | $R_5$ | $R_6$ | Hue | Properties of dyeing |
|---|---|---|---|---|---|---|---|---|---|
| 46 | $O_2N-\langle\rangle-$ | $-C_2H_5$ | H | H | H | $-CH_2CH_2OH$ | H | Red | Sublimation excellent. |
| 47 | Same as above | $-C_2H_5$ | (2')$-OCH_3$ | (5')$OCH_3$ | H | $-CH_2CH_2OH$ | H | Plum | Do. |
| 48 | $O_2N-\langle\rangle-$ | $-CH_3$ | (2')$OC_2H_5$ | H | H | H | H | Yellowish red | Do. |
| 49 | $-\langle\rangle-CONH-\langle\rangle-$ | $C_2H_5$ | H | H | H | $CH_3$ | $CH_3$ | Orange | Do. |

We claim:
1. Aromatic polyester textile material dyed with an azo dye of the formula:

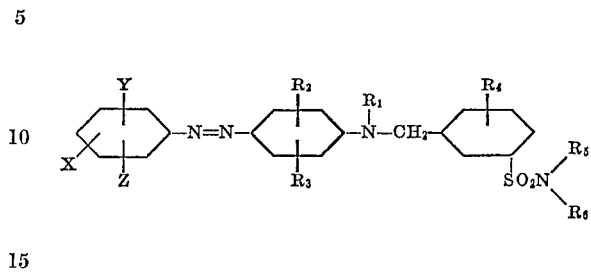

wherein X, Y, and Z are members selected from the group consisting of hydrogen, nitro, chloro, bromo, lower alkyl, lower alkoxy, cyano, sulfamyl, N-lower alkyl sulfamyl, N,N-di-lower alkyl sulfamyl, acetylamino, trifluoromethyl and lower alkyl sulfonyl; $R_1$ is a member selected from the group consisting of lower alkyl, hydroxy lower alkyl and cyano lower alkyl; $R_2$, $R_3$ and $R_4$ are members selected from the group consisting of hydrogen, lower alkyl, lower alkoxy, chlorine and bromine, and $R_5$ and $R_6$ are members selected from the group consisting of hydrogen lower alkyl, cyano lower alkyl and hydroxy lower alkyl.

2. The dyed material of claim 1 wherein X is $NO_2$; Y, Z, $R_2$, $R_3$, $R_4$, $R_5$ and $R_6$ are hydrogen; and $R_1$ is ethyl.

3. The dyed material of claim 1 wherein X is $NO_2$; Y, Z, $R_2$, $R_3$ and $R_4$ are hydrogen; $R_5$ and $R_6$ are methyl; and $R_1$ is ethyl.

4. The dyed material of claim 1 wherein X is $NO_2$; Y is Cl; Z, $R_2$, $R_3$ and $R_4$ are hydrogen; $R_5$ and $R_6$ is ethyl.

5. The dyed material of claim 1 wherein X is $NO_2$; Y is Cl; Z, $R_2$, $R_3$ and $R_4$ are hydrogen; $R_5$ and $R_6$ are methyl; and $R_1$ is ethyl.

6. The dyed material of claim 1 wherein the polyester is polyethylene terephthalate.

References Cited
UNITED STATES PATENTS

| | | | |
|---|---|---|---|
| 3,516,982 | 6/1970 | Dimroth et al. | 260—206 |
| 3,535,306 | 10/1970 | Altermatt et al. | 260—207.1 |
| 3,579,497 | 5/1971 | Ramanathan et al. | 260—207.1 X |

GEORGE F. LEMES, Primary Examiner

T. J. HERBERT, JR., Assistant Examiner

U.S. Cl. X.R.

260—205, 206, 207, 207.1